(12) United States Patent
Wilmes et al.

(10) Patent No.: US 12,046,132 B2
(45) Date of Patent: Jul. 23, 2024

(54) SENSOR LOCALIZATION

(71) Applicant: Ford Global Technologies, LLC, Dearborn, MI (US)

(72) Inventors: Matthew Baer Wilmes, Plymouth, MI (US); Gaurav Pandey, College Station, TX (US); Devarth Parikh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 17/528,563

(22) Filed: Nov. 17, 2021

(65) Prior Publication Data
US 2023/0154313 A1 May 18, 2023

(51) Int. Cl.
*G08G 1/00* (2006.01)
*G08G 1/01* (2006.01)
*G08G 1/052* (2006.01)
*G08G 1/127* (2006.01)
*G08G 1/16* (2006.01)

(52) U.S. Cl.
CPC .......... *G08G 1/0116* (2013.01); *G08G 1/052* (2013.01); *G08G 1/127* (2013.01); *G08G 1/163* (2013.01)

(58) Field of Classification Search
CPC ...... G08G 1/0116; G08G 1/052; G08G 1/127; G08G 1/163

USPC ........................................................ 701/117
See application file for complete search history.

(56) References Cited

U.S. PATENT DOCUMENTS

| 9,052,721 | B1 | 6/2015 | Dowdall et al. | |
|---|---|---|---|---|
| 2020/0103920 | A1* | 4/2020 | Castorena Martinez | G08G 1/166 |
| 2020/0116827 | A1* | 4/2020 | Agarwal | G01S 17/42 |
| 2021/0003711 | A1* | 1/2021 | Vandenberg, III | G01S 17/93 |

FOREIGN PATENT DOCUMENTS

CN  109375228 B  7/2020

* cited by examiner

*Primary Examiner* — Tiffany P Young
(74) *Attorney, Agent, or Firm* — Frank A. MacKenzie; Bejin Bieneman PLC (57) ABSTRACT

First feature points can be determined which correspond to pose-invariant surface model properties based on first data points included in a first lidar point cloud acquired by a sensor. A three-dimensional occupancy grid can be determined based on first data points included in the first lidar point cloud. Dynamic objects in a second lidar point cloud acquired by the sensor can be determined based on the occupancy grid. Second feature points can be determined which correspond to pose-invariant surface model properties based on second data points included in the second lidar point cloud not including the dynamic objects. A difference can be determined between corresponding feature points included in the first feature points and the second feature points. A traffic infrastructure system can be alerted based on the difference exceeding a threshold.

20 Claims, 10 Drawing Sheets

SENSOR LOCALIZATION

BACKGROUND

Data can be acquired by sensors and processed using a computer to determine data regarding objects in an environment around a system. Operation of a sensing system can include acquiring accurate and timely data regarding objects in the system's environment. A computer can acquire data from one or more sensors that can be processed to determine locations of objects. Object location data extracted from data can be used by a computer to operate systems including vehicles, robots, security, and object tracking systems.

DETAILED DESCRIPTION

A sensing system can acquire data, for example lidar point cloud data, regarding an environment around the system and process the data to determine identities and/or locations of objects. For example, a deep neural network (DNN) can be trained and then used to determine objects in lidar point cloud data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of one or more roadways and one or more objects including vehicles and pedestrians, etc. For example, a computing device in a traffic infrastructure system can be programmed to acquire one or more lidar point clouds from one or more sensors included in the traffic infrastructure system, detect objects in the lidar point clouds and communicate labels that identify the objects and locations of the objects. The sensors can include lidar sensors, radar sensors and ultrasound sensor that emit energy and return distances to energy-reflecting surfaces in the environment. The sensors can be stationary and can be mounted on poles, buildings, or other structures to give the sensors a view of the traffic scene including objects in the traffic scene.

In some examples stationary sensors included in a traffic infrastructure system can acquire one or more lidar point clouds of a traffic scene and communicate the lidar point cloud data to a computing device included in the traffic infrastructure system. The computing device included in the traffic infrastructure system can be a server computer because it stores and communicates data to other computing devices over a network connection. The server computer can process the acquired lidar point cloud data and based on data regarding the pose of the stationary sensor, determine a location of an object in global coordinates. The server computer can communicate data regarding the object location in global coordinates to a computing device in a vehicle. Global coordinates are real world locations defined with respect to a real-world coordinate system using coordinates specifying two or three dimensions such as longitude, latitude, and altitude. Location is specified in x, y, and z orthogonal coordinate axes. Orientation is specified as roll, pitch, and yaw rotations about the x, y, and z axes, respectively. Together location and orientation measure the pose of a stationary sensor in six degrees of freedom (DoF). Pose is therefore the location and orientation of the stationary sensor defined with respect to a real-world global coordinate system. In some examples the server computer can communicate the acquired lidar point cloud and the pose of the sensor to another computing device, for example a computing device in a vehicle and the computing device in the vehicle can determine a location for an object in the lidar point cloud data in global coordinates.

The accuracy of stationary sensor data can depend upon accurate data regarding the pose of the stationary sensor. For example, traffic infrastructure systems and vehicles can use stationary sensor data to determine the location, in global coordinates, of objects such as vehicles and pedestrians. Determining accurate locations of objects in stationary sensor data can depend upon having accurate data regarding the pose of the stationary sensor. The pose of a stationary sensor can be determined by acquiring stationary sensor data and determining the location of objects such as roadways and buildings in the stationary sensor data. The location of the objects in global coordinates can be measured in the real world and used to determine the pose of the stationary sensor. Fiducial markers are defined objects and/or markings on objects that can be easily and accurately located in both stationary sensor data and in real world coordinates. One or more fiducial markers can be located in the field of view of a stationary sensor to determine the pose of the stationary sensor using projective geometry calculations that use intrinsic sensor parameters to transform locations in sensor data, e.g., pixel locations, onto real world coordinates. Intrinsic sensor parameters can include lens f-number, lens optical axis, and lens optical centers, etc. Determining the pose of a stationary sensor in global coordinates based on determining the location of real-world objects is referred to herein localization.

Techniques discussed herein improve the ability to provide accurate stationary lidar sensor data to traffic infrastructure computers and vehicle computers by detecting changes in the pose of a stationary sensor. Techniques discussed herein extract a first set of feature points from point cloud data included in a lidar point cloud acquired by a stationary lidar sensor and store the first set of feature points in memory included in a server computer. A second set of feature points can then be extracted from a second lidar point cloud subsequently acquired by the stationary lidar sensor. The first and second sets of feature points are compared to determine differences in corresponding feature points in the first and second lidar point clouds to determine whether the pose of the stationary lidar sensor has changed between the time the first and the second lidar point clouds are acquired. If the pose of the stationary lidar sensor is determined to have changed based on comparing the difference between first and second feature points to a threshold determined based on empirical data, a computer in the traffic infrastructure system that includes the stationary lidar sensor can be notified.

Upon notification of a change in stationary lidar sensor data the traffic infrastructure system can take actions that can include ignoring data from the stationary lidar and determining the new pose of the stationary lidar sensor by localizing the sensor. Techniques discussed herein improve determination of change in the pose of a stationary sensor by determining and storing a first set of features when the stationary sensor is first deployed, and the traffic infrastructure system is offline. A fast matching algorithm can then be applied to the two sets of features, thereby reducing the time and computing resources required to determine a change in stationary sensor pose at a later time, when the traffic infrastructure system is online. Online refers to a time when a computer in the traffic infrastructure system is in communication with a computer not in the traffic infrastructure system, e.g., acquiring and processing sensor data to be communicated to vehicles; offline is when the traffic infrastructure system is not conducting such communications. Techniques discussed herein reduce the time and computing resources required to determine changes in stationary lidar sensor pose enough that each lidar point cloud acquired by a stationary lidar sensor can be checked for changes in pose thereby increasing the reliability and accuracy of stationary lidar sensor data.

Disclosed herein is a method, including determining first feature points which correspond to pose-invariant surface model properties based on first data points included in first point cloud data included in a first lidar point cloud acquired by a sensor, determining a three-dimensional occupancy grid based on the first data points and determining dynamic objects in second point cloud data included in a second lidar point cloud acquired by the sensor based on the three-dimensional occupancy grid. Second feature points can be determined which correspond to the pose-invariant surface model properties based on second data points included in the second point cloud data not including the dynamic objects. A difference can be determined based on corresponding feature points included in the first feature points and the second feature points and a traffic infrastructure system can be alerted based on a magnitude of the difference exceeding a threshold. A vehicle can be operated based on a second computer determining a vehicle path based on determining objects included in third point cloud data acquired by the sensor. Operating the vehicle can be based on the second computer controlling vehicle powertrain, vehicle steering, and vehicle brakes.

The first lidar point cloud and the second lidar point cloud can be acquired with a stationary lidar sensor. The first feature points can be stored in the memory and compared to a plurality of second feature points determined based on a plurality of second lidar point clouds. The first feature points can be determined based on averaging one or more lidar point clouds. The first point cloud data can be filtered to remove first data points that do not have a minimum number of neighbors closer than a minimum distance. Surface normal vectors can be determined for M first data points in the first point cloud data. The first feature points can be determined by determining a Fast Point Feature Histogram for each of the M first data points based on the surface normal vectors. The dynamic objects in the second point cloud data can be determined based on the three-dimensional occupancy grid by deleting data points from the second point cloud data that do not correspond to occupied grid cells from the three-dimensional occupancy grid. The difference between the corresponding feature points included in the first feature points and the second feature points can be determined by determining a mean Chi-squared distance between the first feature points and the second feature points. The threshold can be user-determined based on empirical data. The sensor can be determined to have moved based on a magnitude of the difference exceeding a threshold. The sensor can be a stationary lidar sensor included in the traffic infrastructure system.

Further disclosed is a computer readable medium, storing program instructions for executing some or all of the above method steps. Further disclosed is a computer programmed for executing some or all of the above method steps, including a computer apparatus, programmed to determine first feature points which correspond to pose-invariant surface model properties based on first data points included in first point cloud data included in a first lidar point cloud acquired by a sensor, determine a three-dimensional occupancy grid based on the first data points and determine dynamic objects in second point cloud data included in a second lidar point cloud acquired by the sensor based on the three-dimensional occupancy grid. Second feature points can be determined which correspond to the pose-invariant surface model properties based on second data points included in the second point cloud data not including the dynamic objects. A difference can be determined based on corresponding feature points included in the first feature points and the second feature points and a traffic infrastructure system can be alerted based on a magnitude of the difference exceeding a threshold. A vehicle can be operated based on a second computer determining a vehicle path based on determining objects included in third point cloud data acquired by the sensor. Operating the vehicle can be based on the second computer controlling vehicle powertrain, vehicle steering, and vehicle brakes.

The instructions can include further instructions to acquire the first lidar point cloud and the second lidar point cloud with a stationary lidar sensor. The first feature points can be stored in the memory and compared to a plurality of second feature points determined based on a plurality of second lidar point clouds. The first feature points can be determined based on averaging one or more lidar point clouds. The first point cloud data can be filtered to remove first data points that do not have a minimum number of neighbors closer than a minimum distance. Surface normal vectors can be determined for M first data points in the first point cloud data. The first feature points can be determined by determining a Fast Point Feature Histogram for each of the M first data points based on the surface normal vectors. The dynamic objects in the second point cloud data can be determined based on the three-dimensional occupancy grid by deleting data points from the second point cloud data that do not correspond to occupied grid cells from the three-dimensional occupancy grid. The difference between the corresponding feature points included in the first feature points and the second feature points can be determined by determining a mean Chi-squared distance between the first feature points and the second feature points. The threshold can be user-determined based on empirical data. The sensor can be localized based on a magnitude of the difference exceeding a threshold. The sensor can be a stationary lidar sensor included in the traffic infrastructure system.

Figure 1:
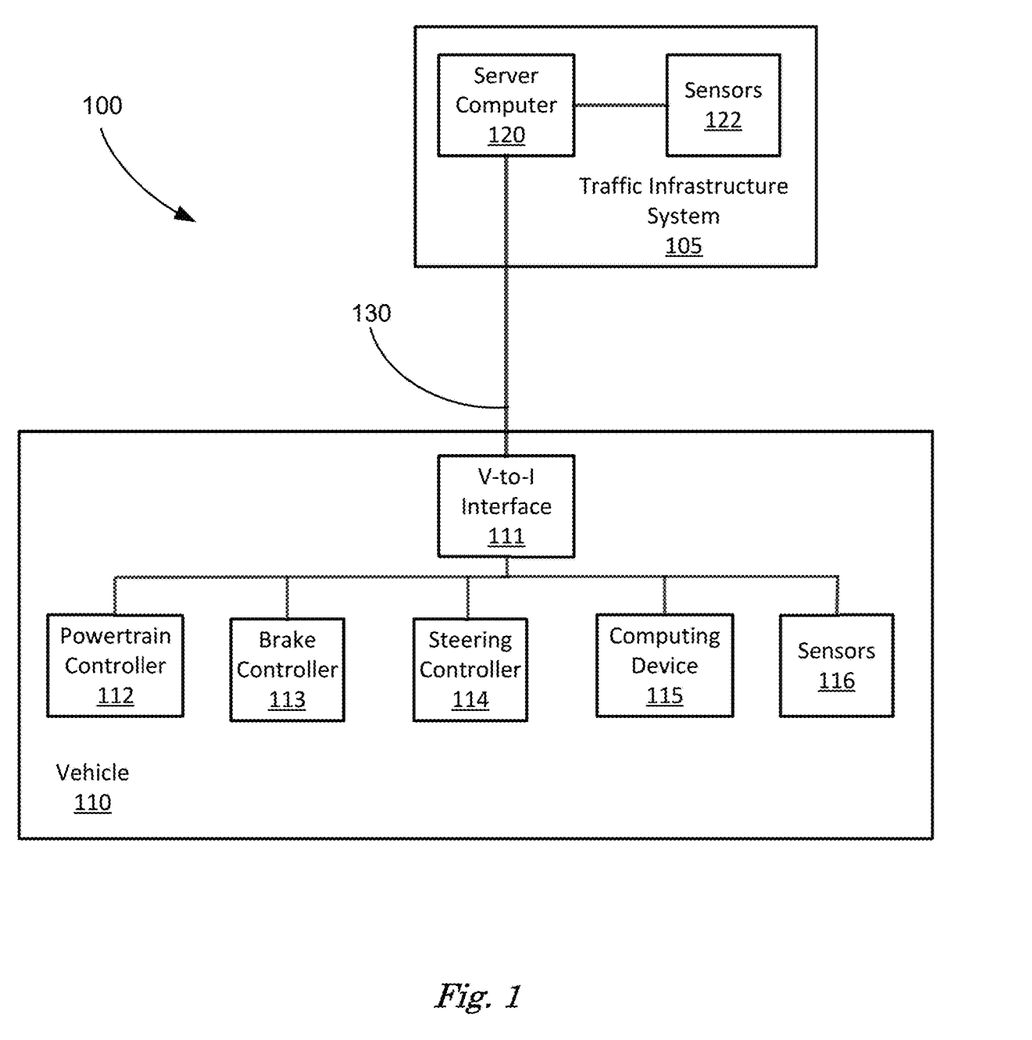
FIG. 1 is a block diagram of an example traffic infrastructure system.

FIG. 1 is a diagram of a sensing system 100 that can include a traffic infrastructure system 105 that includes a server computer 120 and a sensor 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN)

bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
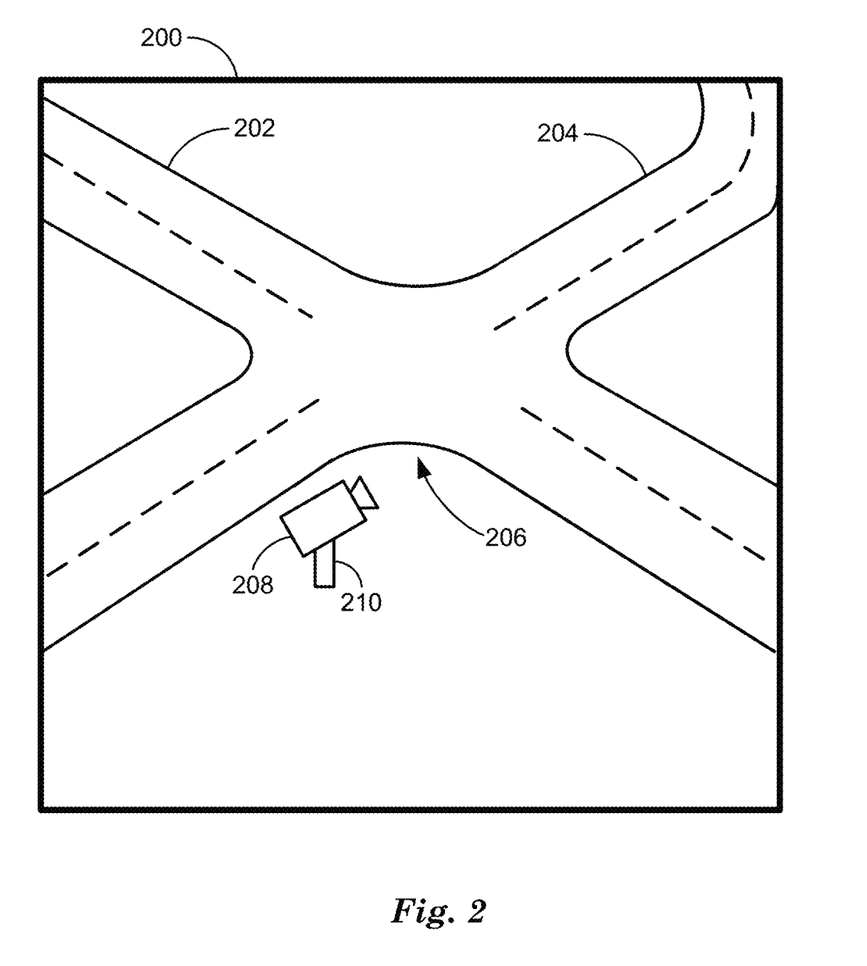
FIG. 2 is a diagram of an example traffic scene.

FIG. 2 is a diagram of an example traffic scene 200. Traffic scene 200 includes roadways 202, 204 that meet at an intersection 206 and a stationary lidar sensor 208 on a mount 210. Stationary lidar sensor 208 can be a sensor 122 included in a traffic infrastructure system 105. In some examples stationary lidar sensor 208 can be a camera, a radar sensor, or an ultrasound sensor, for example. Mount 210 can be a traffic signal pole, a light pole, a purpose-built pole, a building, or existing structure such as a bridge, an overpass, or a sign pole, for example.

Figure 3:
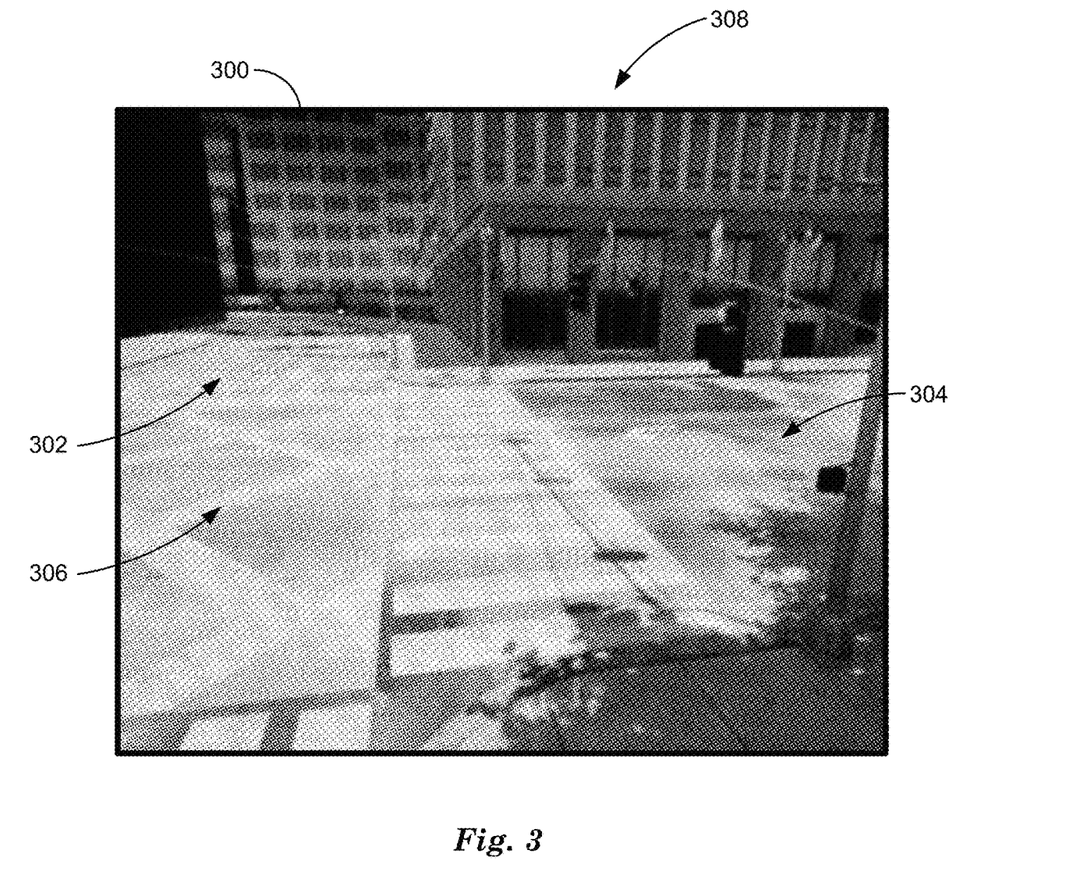
FIG. 3 is a diagram of an example lidar point cloud of a traffic scene.

FIG. 3 is a diagram of an example camera image 300 of traffic scene 200 acquired by a camera located at the same location and orientation as stationary lidar sensor 208. Visible in camera image 300 are roadways 302, 304 and intersection 306. Also visible in camera image 300 are buildings 308 adjacent to roadways 302, 304. Camera image 300 is included as a guide for understanding lidar point cloud 400 included in FIG. 4, below.

Figure 4:
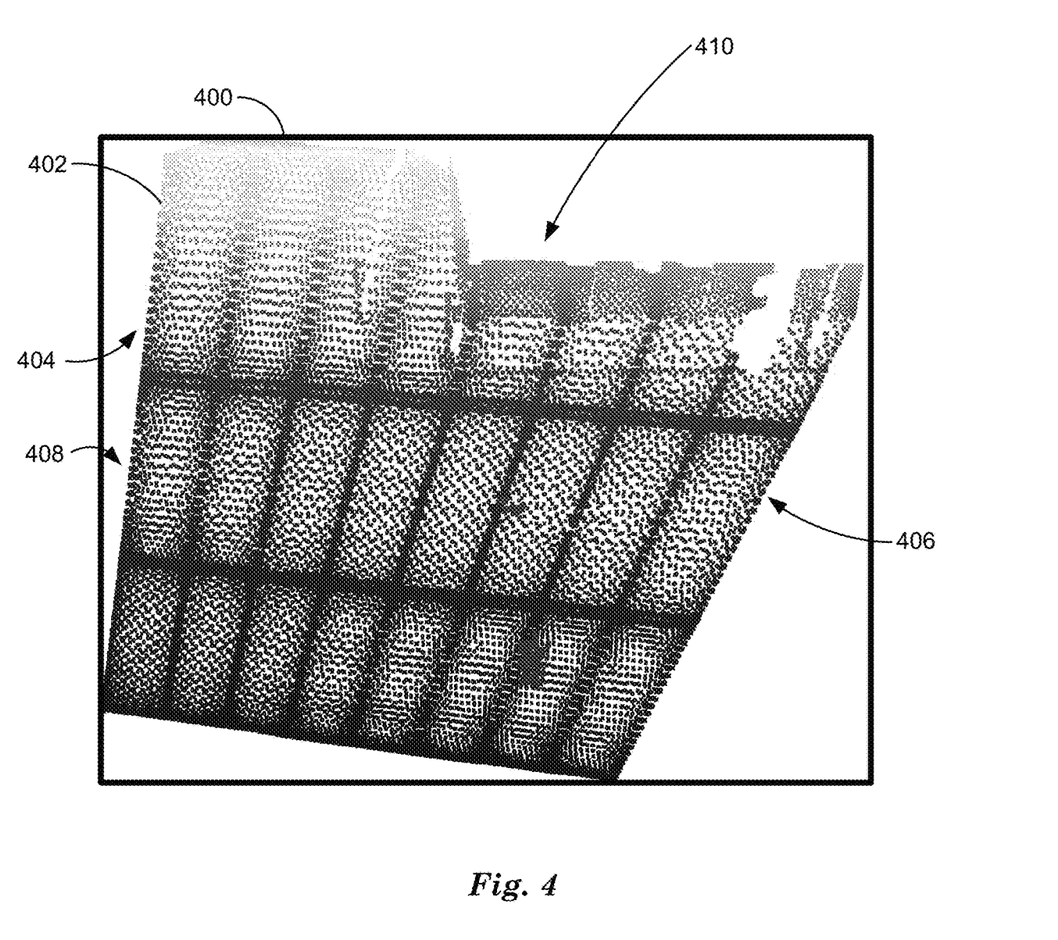
FIG. 4 is a diagram of example lidar point cloud of a traffic scene.

FIG. 4 is a diagram of an example lidar point cloud 400 including point cloud data 402 of traffic scene 200 acquired by a stationary lidar sensor 208 from the same location and orientation as the camera image 300 in FIG. 3. Point cloud data 402 includes data points corresponding to distances or range from a point in lidar sensor 208 to surfaces in the traffic scene 200 rather than reflectance data included in visible light images. The point cloud data 402 includes data points corresponding to roadways 404, 406 and the intersection 408. Also included in point cloud data 402 are data points corresponding to buildings 410 adjacent to roadways 404, 406. Point cloud data 402 is acquired by a lidar sensor by emitting pulses of light radiation, typically in the infrared spectrum, and measuring the time of flight of the infrared pulse as it is reflected by surfaces in the traffic scene 200. Lidar sensor can also measure a phase difference in a modulated pulse as it is reflected by surfaces in the traffic scene 200. The emitted pulses can be scanned over a traffic scene 200 and the radial direction of the emitted pulse with respect to an optical axis of the stationary lidar sensor 208 noted. Pixel x, y addresses in the lidar point cloud 400 correspond to the radial direction of the lidar pulse with respect to an optical center of the stationary lidar sensor 208 and the pixel value corresponds to the distance from the optical center of the stationary lidar sensor 208 to the surface in the traffic scene 200 that reflected the lidar pulse. A 3D point cloud is a set of data points, where the data points are x, y, z locations in a 3D space. A lidar point cloud is formed by viewing the 3D point cloud from a particular angle and location.

Advantageously, techniques herein localize a lidar sensor by detecting a difference in features corresponding to data points included in a background map with a second set features corresponding to data points included in a second lidar point cloud acquired by a stationary lidar sensor 208. In this context, localize means to determine whether the pose of a stationary lidar sensor 208 has changed with respect to a previously determined pose. Background map data points are data points corresponding to distances to surfaces in the traffic scene 200 that are not expected to change in two or more sets of point cloud data 402 acquired by a stationary lidar sensor 208. For example, data points corresponding to roadways 404, 406, the intersection 408, and buildings 410 should not be expected to change unless the pose of the stationary lidar sensor 208 changes or if occluded by a dynamic object. A dynamic object is an object that is moving or does not occur in a first lidar point cloud 400 or background map.

Figure 5:
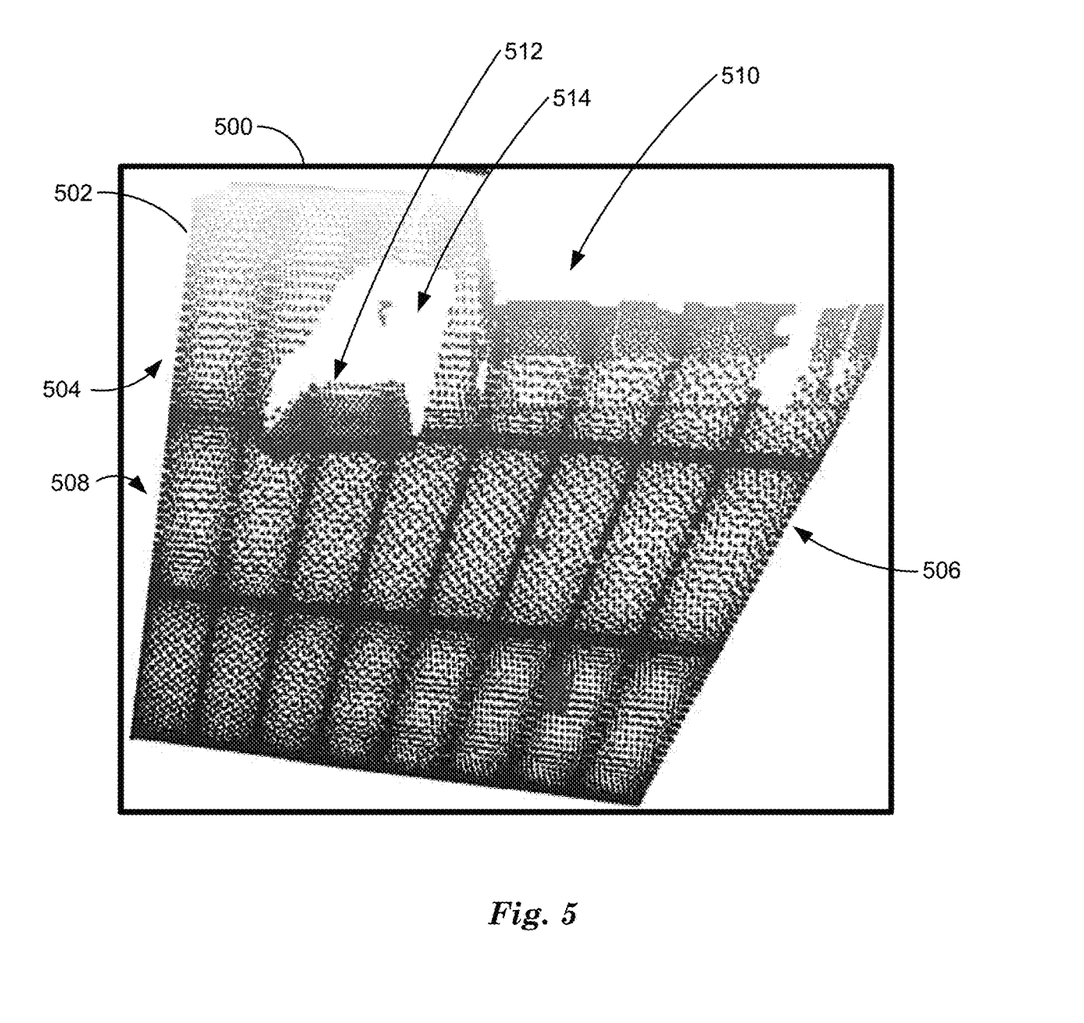
FIG. 5 is a diagram of example lidar point cloud of a traffic scene including a dynamic object.

Determining a change in stationary lidar sensor 208 pose includes two stages. The first stage includes acquiring a lidar point cloud 400 or background map and determining a first set of features corresponding to data points included in the lidar point cloud 400. The second stage includes acquiring a second lidar point cloud 500, determining a second set of features and comparing the second set of features to the first set of features. Determining the first set of features is performed offline, e.g., during setup, after the stationary lidar sensor 208 has been installed and calibrated to determine a six DoF pose of the stationary lidar sensor 208 but before the stationary lidar sensor 208 begins acquiring data for use in a vehicle 110, preferably before the traffic scene 200 includes any dynamic objects such as vehicles or pedestrians. If dynamic objects are included in the lidar point cloud 400 acquired by the stationary lidar sensor 208, they can be removed using techniques that determine the dynamic objects and the dynamic objects can be removed from the lidar point cloud 400. Dynamic objects can be determined by acquiring a plurality of lidar point clouds 400 and determining data points that change value over the plurality of lidar point clouds 400. Data points corresponding to background data points do not change value from lidar point cloud 400 to lidar point cloud 400 while data points corresponding to dynamic object will change value. Data points which do not change value over the plurality of lidar point clouds 400 are retained as background data points in a background map and data points which change value can be eliminated. The background map can be determined based on a single lidar point cloud 400 or a plurality of lidar point clouds 400 averaged to reduce pixel noise. The lidar point cloud 400 acquired at the first stage of the technique discussed herein is referred to as a background map.

In a first step of the first stage of determining a change in stationary lidar sensor 208 pose, the background map is pre-processed by filtering the point cloud data to remove data points that do not include a dense cluster of data points. A dense cluster of data points is a set of data points that all have a minimum number of neighbors closer than a minimum distance. For example, the background map can be processed to remove any data points that does not have at least five additional data points within 0.5 meters of the original data point as measured in global coordinates. Pre-processing the point cloud data 402 generates point cloud data 402 that only includes dense clusters of data points. Point cloud data 402 that only includes dense cluster of data points permits construction of surface normal vectors for each data point in the point cloud data 402. Surfaces are constructed for each of the remaining M data points based on generating a plane surface based on surrounding data points and constructing a surface normal vector based on the plane surface for each of the M data points, where the surface normal vectors are oriented to point towards the stationary lidar sensor 208, e.g., surface normal vectors point up towards the sky rather than into the ground. For example, surface normal vectors on the road surface all point towards the sky.

In a second step, a 33-dimensional fast point feature histogram (FPFH) is calculated for each of the M data points and surface normal vectors. The FPFH is a technique for point cloud data 402 representation that provides reliable registration results. FPFH determines a histogram for 33 bins based on 33 different measures of the M data points based on the surface normal vectors including directions in three dimensions and comparisons of angular variations of the three dimensions of the surface normal vector with the three dimensions of surface normal vectors for surrounding data points. In this example 33 bins are used; however, more or fewer bins can be used advantageously. For example, the M data points have a three-dimensional neighborhood of data points $p_i$ having a surface normals $n_i$. The three-dimensional neighborhoods have a Darboux uvw frame defined as $u=n_i$, $v=(p_i-p_i)\times u$, $w=u\times v$. Angular variations $\alpha$, $\varphi$, and $\theta$ of $n_i$ and $n_j$, ($i\neq j$) can be determined based on values of u, v, and w for each pair of data points in the neighborhood as:

$$\alpha=v\cdot n_j, \varphi=(u\cdot(p_i-p_1))/\|p_i-p_j\|, \theta=\arctan(w\cdot n_j, u\cdot n_i) \quad (1)$$

Determining a histogram with 33 bins based the measures of angular variations in a neighborhood around a point provides a pose invariant feature that can be used to determine corresponding datapoints in two lidar point clouds 400, 500, for example. Determination of FPFH is discussed, for example, in R. B. Rusu, N. Blodow, and M. Beetz, "Fast Point Feature Histograms (FPFH) for 3D registration," 2009 IEEE International Conference on Robotics and Automation, May 2009, pp. 3212-3217.

In a third step, an occupancy grid is determined based on the background map. The rectangular three-dimensional (3D) space corresponding to the 3D volume occupied by the point cloud data 402 is divided up into voxels (volume pixels) corresponding to contiguous 0.005 m³ cubes. In this example 0.005 m³ cubes were used, however larger or smaller cubes can be used advantageously. Each cube has a value that is set to "0" if it does not include one of the M data points included in the point cloud data 402 and "1" if the voxel includes one of the M data points. The background map including the M 33-dimensional FPFH vectors, and the occupancy grid is then stored in the server computer 120 included in the traffic infrastructure system 105.

FIG. 5 is a diagram of a second lidar point cloud 500 acquired by a stationary lidar sensor 208 during operation of a traffic infrastructure system 105. During operation of a traffic infrastructure system 105, a stationary lidar sensor 208 can acquire a lidar point cloud 500 that includes point cloud data 502 of a traffic scene. The second lidar point cloud 500 includes data points corresponding to roadways 504, 506, an intersection 508 and buildings 510. The second lidar point cloud 400 also includes data points corresponding to an object 512, in this example a vehicle, and missing data corresponding to a shadow 514 cast on the point cloud data 502 by the object 512. The lidar point cloud 500 can be processed by a server computer 120 included in the traffic infrastructure system 105 or a computing device 115 included in a vehicle 110 to determine global coordinate locations of the object 512 included in the lidar point cloud 500. Determining a global coordinate location of an object 512 included in a lidar point cloud 500 acquired by a stationary lidar sensor 208 can depend upon data regarding the six DoF pose of the stationary lidar sensor 208. Techniques described herein can improve data regarding the six DoF pose of a stationary lidar sensor 208 be detecting a change in the six DoF pose of the stationary lidar sensor 208. Techniques described herein are fast enough and use few enough computing resources to permit them to be executed periodically as lidar point clouds 500 are acquired, for example every five seconds. Techniques described herein can be executed for as lidar point clouds 500 are acquired, thereby providing data regarding stationary lidar sensor 208 localization on a continuing basis while the stationary lidar sensor 208 operates.

At the first step of the second stage of determining a change in stationary lidar sensor 208 pose, a second lidar point cloud 500 including point cloud data 502 is acquired by a stationary lidar sensor 208. The point cloud data 502 is pre-processed as described above in relation to FIG. 4 to remove data points not included in dense clusters of data points. Following pre-processing, the second lidar point cloud 500 is filtered using the occupancy grid generated based on the first lidar point cloud 400 acquired at the first stage discussed above in relation to FIG. 3. Data points from the second lidar point cloud 400 not corresponding to occupied grid cells in the occupancy grid are deleted from the second lidar point cloud 500. Filtering the second lidar point cloud 500 in this fashion will remove data points corresponding to the object 512. As explained above, the occupancy grid is a three-dimensional array with entries corresponding to the data points from the background map. A dynamic object will generate data points at three-dimensional locations which were not occupied in the background map. Data points corresponding to the dynamic object will not occur in the occupancy grid and will therefore be eliminated. Filtering the second lidar point cloud 500 in this fashion will result in data that contains N data points, where N is less than or equal to M.

Following data point filtering, the N data points are then processed as described above in relation to FIG. 4, where surface normal vectors are generated for each of the N data points and a 33-dimensional FPFH vector is calculated for each of the N data points and surface normal vectors. The 33-dimensional vectors for the N data points result in an N×33 feature matrix, $L_{feat}$. The columns of $L_{feat}$ are averaged to form a mean FPFH vector $L_{MFPFH}$. All data points whose distance with $L_{MFPFH}$ is closer than a user-determined threshold $\delta_{thresh}$ are discarded, leaving only distinct features. Chi-squared distance $\chi^2$ is used to calculate the distance between $L_{MFPFH}$ and each row of $L_{feat}$ because distances between two histograms are being calculated. Chi squared distance $\chi^2 = D(L_{MFPFH}, L_{feat}[i, :])$ is calculated according to the equation:

$$D(L_{MFPFH}, L_{feat}[i, :]) = \sum_{k=0}^{32} \frac{[L_{MFPFH}[k] - L_{feat}[i, k]]^2}{L_{MFPFH}[k] + L_{feat}[i, k]}, i \in [0, N-1] \quad (2)$$

Note that in instances where $L_{MFPFH}[k]+L_{feat}[i, k]=0$, the $\chi^2$ distance is undefined. In this instance the value 0 is used in the summing term so it has no effect on the distance. Following the calculation of equation (2), the resulting point cloud $\hat{L}_{feat}$ matrix will have n rows, where n≤N for a sufficiently large threshold. The corresponding data points from the second point cloud $\hat{L}_{pc}$ will also have fewer points n.

Data point matching between a first lidar point cloud and a second lidar point cloud can be performed by fast global registration. Fast global registration is used to determine the registration between the N data points from the second lidar point cloud 500 and the M data points from the first lidar point cloud 500. After finding correspondences between the N data points from the second lidar point cloud 500 and the M data points from the first lidar point cloud, the set of corresponding data points is reduced using a reciprocity test and tuple test. Fast global registration is discussed in Q.-Y. Zhou, J. Park, and V. Koltun, "Open3D: A Modern Library for 3D Data Processing," OPEN3D.org, available as of the filing date of this application. Although fast global matching provides a transformation between the two sets of data points, in this example we are only interested in the correspondence between the two sets of data points. Correspondence refers to the determining matched pairs of data points from the N data points from the second lidar point cloud 500 and the M data points from the first lidar point cloud 500.

The data points and feature vectors from the second lidar point cloud 500 ($\hat{L}_{pc}$ and $\hat{L}_{feat}$) and the data points and feature vectors from the first lidar point cloud 400 ($BM_{pc}$ and $BM_{feat}$) are then matched using fast global matching. Fast global matching can be determined by the registration_fast_based_on_feature_matching routine included in the OPEN3D library of 3D image processing routines available from the website OPEN3D.org as of the time of filing this application. The maximum correspondence distance is set to 0.5 m, the tuple scale is set to 0.99, graduated non-convexity is enabled, and the number of iterations is set to 1,000. These values for correspondence distance, tuple scale, graduated non-convexity, and number of iterations are used in this example, however other values for these parameters can be used advantageously. The output of the fast global registration routine is a c×2 array of indices C. The first column (C[:, 0]) contains indices from $\hat{L}_{pc}$ and the second column (C[:, 1]) contains corresponding indices from $BM_{pc}$ that are the closest matches. Using these indices, the c correspondence features of $\hat{L}_{pc}$ can be found using the equation:

$$\hat{L}_c = \hat{L}_{feat}[C[:,0],:], \hat{L}_c \subseteq \hat{L}_{feat} \quad (3)$$

The result will be a c×33 feature matrix. Similarly, the c correspondence features of $BM_{pc}$ can be found using:

$$BM_c = BM_{feat}[C[:,1],:], BM_c \subseteq BM_{feat} \quad (4)$$

$BM_c$ will also be a c×33 matrix. The $\chi^2$ distance between the $j^{th}$ correspondence pair is determined using the equation:

$$D(\hat{L}_c[j, :], BM_c[j, :]) = \sum_{k=0}^{32} \frac{[\hat{L}_c[j, k] - BM_c[j, k]]^2}{\hat{L}_c[j, k] + BM_c[j, k]}, j \in [0, c-1] \quad (5)$$

The pairwise distances are averaged to produce an overall mean $\chi^2$ distance between the two sets of point cloud feature points.

Figure 6:
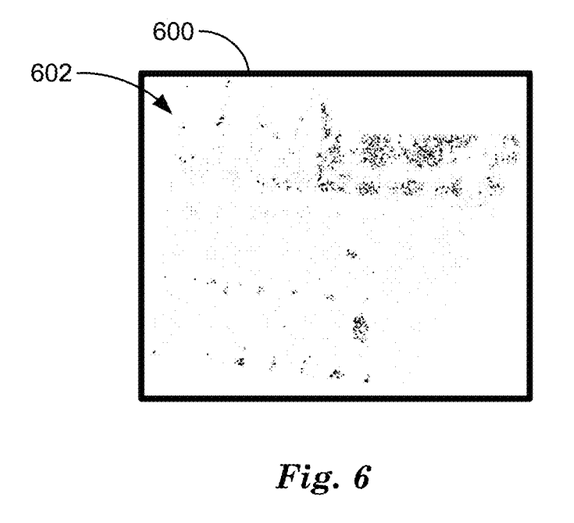
FIG. 6 is a diagram of an example lidar point cloud that includes matched data points between a lidar point cloud and a background map.

FIG. 6 is a diagram of a lidar point cloud 600 including data points 602 corresponding to the feature points $\hat{L}_c[j,:]$ matched from the second lidar point cloud 500 and the feature points $BM_c[j,:]$ from the first lidar point cloud 400. When mean $\chi^2$ distance between the two sets of point cloud feature points as calculated by equation (5) are greater than a user selected threshold $\chi_{thresh}$, it can be determined that a localization error has occurred, and the traffic infrastructure system 105 will be alerted. The threshold $\chi_{thresh}$ can be empirically determined by acquiring a plurality of lidar point clouds 400 and calculating a maximum mean $\chi^2$ distance for each lidar point cloud 400 when no movement of the stationary lidar sensor 208 has occurred. The $\chi_{thresh}$ should be selected to indicate a localization error when the stationary lidar sensor 208 has been determined to move, and not indicate a localization error when the stationary lidar sensor 208 has been determined not to have moved.

Figure 7:
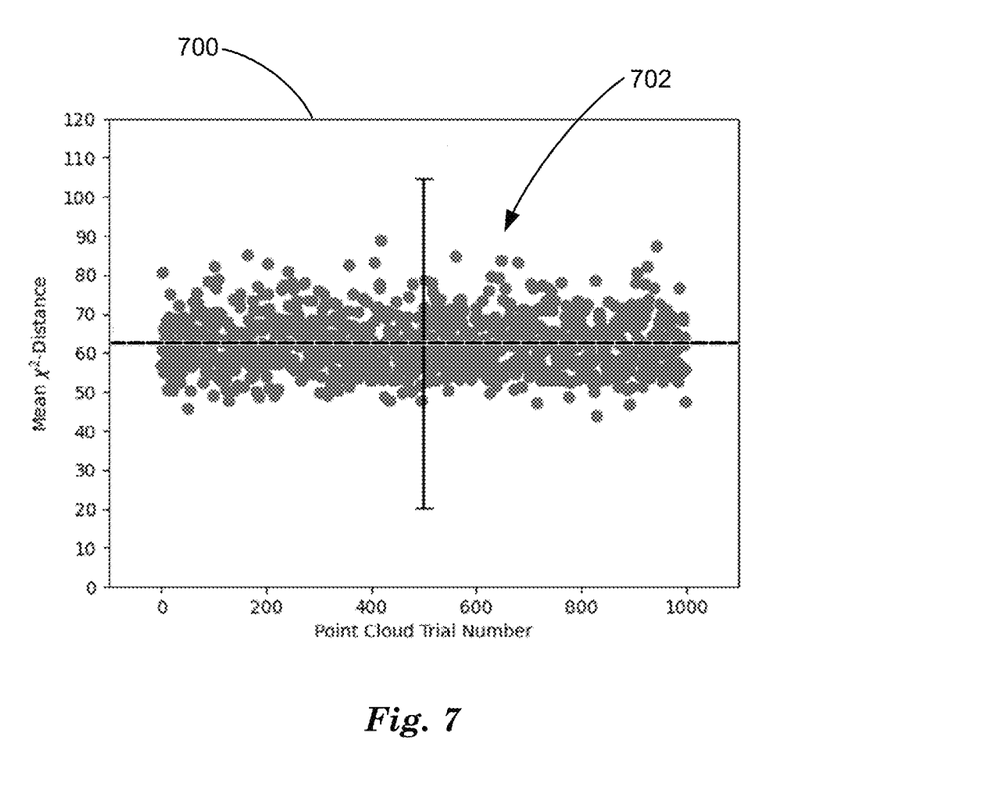
FIG. 7 is a diagram of an example graph of feature point differences.

FIG. 7 is a diagram of a graph 700 that plots trial number (x-axis) versus mean $\chi^2$ distance (y-axis). Data points 702 correspond to the mean $\chi^2$ distance between feature points $\hat{L}_c[j,:]$ from a plurality of second lidar point clouds 500 and the feature points $BM_c[j,:]$ from a first lidar point cloud 400. In this example, the pose of the stationary lidar sensor 208 has not moved between trials. The value of $\chi_{thresh}$ for this stationary lidar sensor 208 can be selected to indicate that all the measured mean $\chi^2$ distances correspond to no movement of the lidar sensor 208, i.e., an $\chi_{thresh}$ of greater than 90, for example.

In examples where a localization error is not indicated, the stationary sensor 208 in the traffic infrastructure system 105 can continue to acquire lidar point clouds 500. Techniques discussed herein can continue to process lidar point cloud 500 acquired by stationary sensor 208 as discussed in relation to FIG. 5, above, to determine a possible pose error. In examples where the techniques discussed herein indicate a pose error, the traffic infrastructure system 105 can be alerted that the stationary lidar sensor 208 has moved and that locations of objects determined based on data output from the stationary lidar sensor 208 may be incorrect. The traffic infrastructure system 105 can ignore subsequent lidar point clouds 500 output from the stationary lidar sensor 208 and alert users that the stationary lidar sensor 208 should be serviced to measure a new six DoF pose for the stationary lidar sensor 208. In examples where the stationary lidar sensor 208 is determined to have moved the first stage as discussed in relation to FIG. 3, above, can be executed to acquire a new first lidar point cloud 400, process it and store it in memory included in the traffic infrastructure system to permit determination of changes in pose based on the new pose of the stationary lidar sensor 208.

Figure 8:
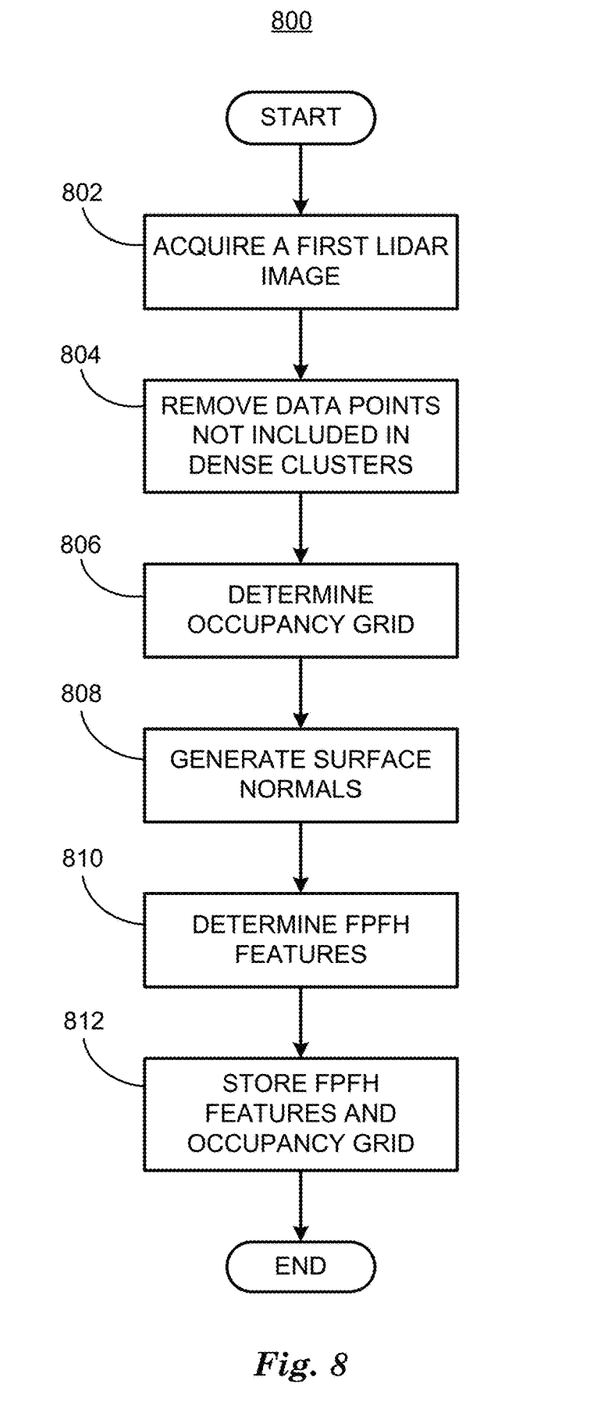
FIG. 8 is a flowchart diagram of an example first stage process to localize a stationary sensor.

FIG. 8 is a diagram of a flowchart, described in relation to FIGS. 1-7, of a first stage process for determining an occupancy grid and FPFH features from a background map for a stationary lidar sensor 208 in a traffic infrastructure system 105. Process 800 can be implemented by a processor of a server computer 120, taking as input data acquired by a stationary lidar sensor 208, and executing commands, and outputting data regarding the location of stationary sensor 208. Process 800 includes multiple blocks that can be executed in the illustrated order. Process 800 could alternatively or additionally include fewer blocks or can include the blocks executed in different orders.

Process 800 begins at block 802, where a server computer 120 included in a traffic infrastructure system 105 acquires data from a sensor 122. The sensor 122 can be a stationary lidar sensor 208 and the data can be a lidar point cloud 400 including point cloud data 402, referred to herein as a background map. The background map is acquired at deployment, i.e., setup time, preferably when no dynamic objects are included in a field of view of the stationary lidar sensor 208. If dynamic objects are included in the background map, they can be removed as discussed above in relation to FIG. 4.

At block 804 the server computer 120 included in the traffic infrastructure system 105 pre-processes the point cloud data 402 included in the background map to remove data points that are not included in dense cluster of data points as discussed above in relation to FIG. 4.

At block 806 the server computer 120 determines an occupancy grid based on the dense clusters of data points included in the background map as discussed in relation to FIG. 4, above.

At block 808 the server computer 120 generates surface normal vectors based on the dense clusters of data points included in the background map as discussed above in relation to FIG. 4.

At block 810 the server computer 120 generates 33-dimensional FPFH features for the 3D data points included in the background map as discussed above in relation to FIG. 4.

At block 812 the server computer 120 stores the occupancy grid and 33-dimensional FPFH features for the 3D data points included in the background map in memory included in the server computer 120. After block 812 process 800 ends.

Figure 9:
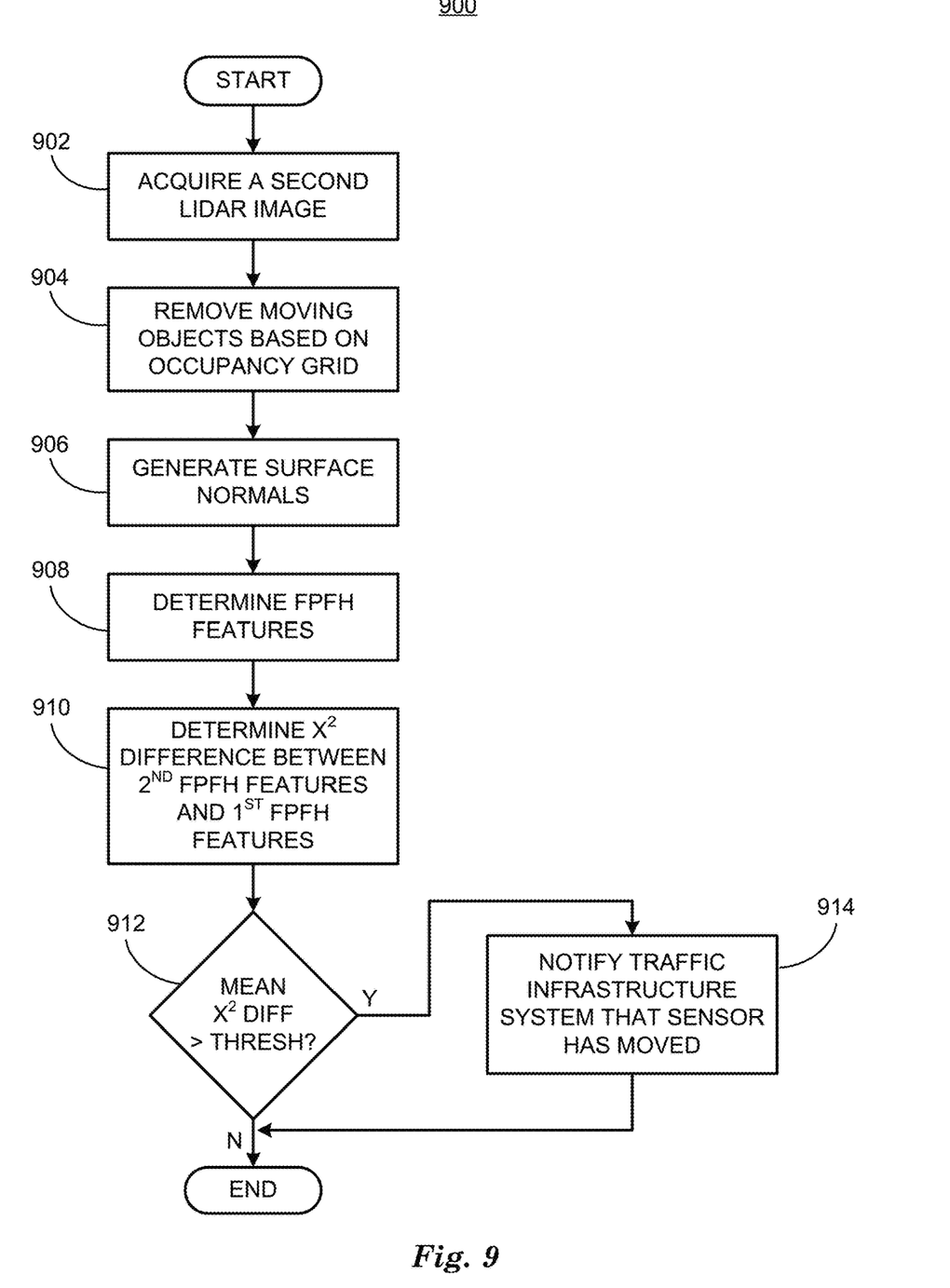
FIG. 9 is a flowchart diagram of an example second stage process to localize a stationary sensor.

FIG. 9 is a diagram of a flowchart, described in relation to FIGS. 1-8, of a second stage process for localizing a stationary lidar sensor 208 in a traffic infrastructure system 105. Process 900 can be implemented by a processor of a server computer 120, taking as input data acquired by a stationary lidar sensor 208, and executing commands, and outputting data regarding the location of stationary sensor 208. Process 900 includes multiple blocks that can be executed in the illustrated order. Process 900 could alternatively or additionally include fewer blocks or can include the blocks executed in different orders.

At block 902 where a server computer 120 included in a traffic infrastructure system 105 acquires data from a sensor 122. The sensor 122 can be a stationary lidar sensor 208 and the data can be a second lidar point cloud 500 including point cloud data 502. The second lidar point cloud 500 can be acquired during operation of the traffic infrastructure system 105, i.e., when a traffic scene 200 includes dynamic objects. The dynamic objects can be located in the second lidar point cloud 500 by server computer 120 or computing device 115 included in a vehicle 110. The location of the dynamic object, which can be a vehicle or a pedestrian, for example, can be used by a computing device 115 to determine a vehicle path upon which to operate a vehicle 110. To provide an accurate location of the dynamic object in global coordinates, the pose of the stationary lidar sensor 208 should be unchanged from the pose of the stationary lidar sensor 208 at setup time. Techniques discussed herein can determine changes in pose of a stationary lidar sensor 208 quickly and efficiently enough to be able to test each lidar point cloud 500 acquired by a stationary lidar sensor 208.

At block 904 server computer 120 can remove dynamic objects from the acquired lidar point cloud 500. Dynamic objects are removed from the acquired lidar point cloud 500 by comparing the data points included in the acquired lidar point cloud 500 to the occupancy grid determined based on the background map from block 806 in process 800 and discussed in relation to FIG. 5, above. Removing data points corresponding to dynamic objects permits the feature points determined in the acquired lidar point cloud 500 to be compared to feature points based on the background map stored in memory included in server computer 120.

At block 906 server computer 120 determines data points corresponding to dense groupings of data points and determines surface normals for each data point as discussed above in relation to FIGS. 4 and 5.

At block 908 server computer 120 determines FPFH features for the data points of the acquired lidar point cloud 500 as discussed in relation to FIGS. 4 and 5, above.

At block 910 server computer 120 determines a mean $\chi^2$ distance between the FPFH features for the acquired lidar point cloud 500 and the stored FPFH features for the background map as discussed in relation to FIG. 5, above.

At block 912 the mean $\chi^2$ distance is compared to a user selected threshold $\chi_{thresh}$. If the mean $\chi^2$ distance is greater than $\chi_{thresh}$, process 900 passes to block 914 to notify the traffic infrastructure system 105 that the stationary lidar sensor 208 has moved. If the mean $\chi^2$ distance is less than or equal to than $\chi_{thresh}$, the pose of stationary lidar sensor 208 is determined to be unchanged and process 900 ends.

At block 914 the server computer 120 notifies the traffic infrastructure system 105 that the stationary lidar sensor 208 has moved. Upon being notified that the stationary lidar sensor 208 has moved, the traffic infrastructure system 105 can disregard lidar point clouds 500 acquired by the stationary lidar sensor 208 because the location of any dynamic objects determined based on the lidar point clouds 500 will be unreliable. The traffic infrastructure system can also alert users that the stationary lidar sensor 208 can be re-localized to permit accurate determination of dynamic object locations based on the lidar point clouds 500. Following block 914 process 900 ends.

Figure 10:
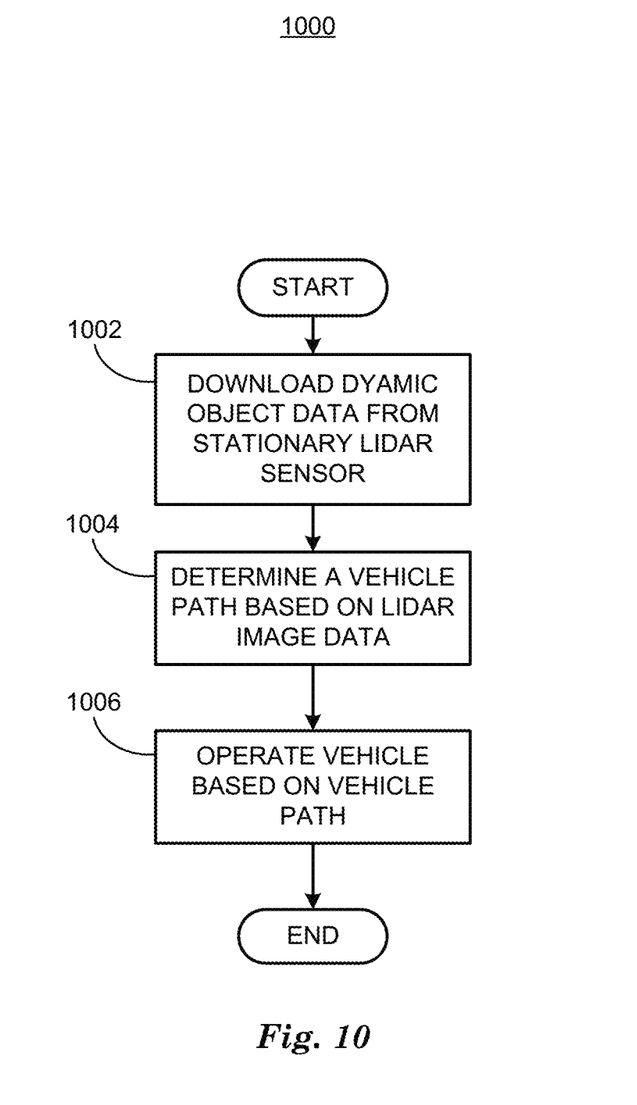
FIG. 10 is a flowchart diagram of an example process to operate a vehicle using a localized stationary sensor.

FIG. 10 is a diagram of a flowchart, described in relation to FIGS. 1-9, of a process for operating a vehicle 110 based on lidar point cloud 500 data acquired by a stationary lidar sensor 208 included in a traffic infrastructure system 105.

Process 1000 can be implemented by a processor of a computing device 115 included in a vehicle 110, taking as input data from server computer 120. Process 1000 includes multiple blocks that can be executed in the illustrated order. Process 1000 could alternatively or additionally include fewer blocks or can include the blocks executed in different orders.

Process 1000 begins at block 1002, where a computing device 115 in a vehicle 110 downloads dynamic object data determined by server computer 120 based on one or more lidar point clouds 500. The downloaded stationary lidar sensor 208 data can be used in addition to sensor data acquired from sensors 116 included in a vehicle 110. Computing device 115 can assume that dynamic object data determined based on the lidar point cloud 500 downloaded from server computer 120 includes accurate global coordinate data because server computer 120 has confirmed the pose of the stationary lidar sensor has not changed by comparing features determined based on an acquired lidar point cloud 500 with features determined based on a background map as discussed in relation to FIGS. 4, 5, 8 and 9, above.

At block 1004 computing device 115 determines a vehicle path based on the lidar point cloud 500. Dynamic object data can be determined by the server computer 120 based on a lidar point cloud 500 by inputting the lidar point cloud 500 to a trained deep neural network, for example. A vehicle path is a polynomial function that includes maximum and minimum lateral and longitudinal accelerations to be applied to vehicle motion as it travels along the vehicle path. The vehicle path can be determined to avoid contact with the dynamic object, which can include other vehicles and pedestrians, for example.

At block 1006 computing device 115 outputs commands to controllers 112, 113, 114 to control vehicle powertrain, vehicle steering, and vehicle brakes to control vehicle motion to operate vehicle 110 along the vehicle path determined at block 1004. Following block 1006 process 1000 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
determine pre-processed first data points included in first point cloud data included in a first lidar point cloud acquired by a sensor by filtering the first point cloud data to remove first data points that do not have a minimum number of neighbors closer than a minimum distance;
determine first feature points which correspond to pose-invariant surface model properties based on the pre-processed first data points;
determine a three-dimensional occupancy grid based on the pre-processed first data points;
determine dynamic objects in second point cloud data included in a second lidar point cloud acquired by the sensor based on the three-dimensional occupancy grid;
determine filtered second data points included in the second point cloud by removing the dynamic objects;
determine second feature points which correspond to the pose-invariant surface model properties based on the filtered second data points;
determine a difference based on corresponding feature points included in the first feature points and the second feature points; and alert a traffic infrastructure system based on a magnitude of the difference exceeding a threshold.

2. The computer of claim 1, the instructions including further instructions to operate a vehicle based on a second computer determining a vehicle path based on determining objects included in third point cloud data acquired by the sensor.

3. The computer of claim 2, wherein operating the vehicle is based on the second computer controlling vehicle powertrain, vehicle steering, and vehicle brakes.

4. The computer of claim 1, the instructions including further instructions to acquire the first lidar point cloud and the second lidar point cloud with a stationary lidar sensor.

5. The computer of claim 1, wherein the first feature points are stored in the memory and compared to a plurality of second feature points determined based on a plurality of second lidar point clouds.

6. The computer of claim 1, the instructions including further instructions to determine the first feature points based on averaging one or more lidar point clouds.

7. The computer of claim 1, the instructions including further instructions to determine surface normal vectors for M first data points in the first point cloud data.

8. The computer of claim 7, the instructions including further instructions to determine the first feature points by determining a Fast Point Feature Histogram for each of the M first data points based on the surface normal vectors.

9. The computer of claim 1, the instructions including further instructions to determine the dynamic objects in the second point cloud data based on the three-dimensional occupancy grid by deleting data points from the second point cloud data that do not correspond to occupied grid cells from the three-dimensional occupancy grid.

10. The computer of claim 1, the instructions including further instructions to determine the difference between the corresponding feature points included in the first feature points and the second feature points by determining a mean Chi-squared distance between the first feature points and the second feature points.

11. The computer of claim 1, wherein the threshold is user-determined based on empirical data.

12. A method, comprising:
determining pre-processed first data points included in first point cloud data included in a first lidar point cloud acquired by a sensor by filtering the first point cloud data to remove first data points that do not have a minimum number of neighbors closer than a minimum distance;
determining first feature points which correspond to pose-invariant surface model properties based on the pre-processed first data points;
determining a three-dimensional occupancy grid based on the pre-processed first data points;
determining dynamic objects in second point cloud data included in a second lidar point cloud acquired by the sensor based on the three-dimensional occupancy grid;
determining filtered second data points included in the second point cloud by removing the dynamic objects;
determining second feature points which correspond to the pose-invariant surface model properties based on the filtered second data points;
determining a difference between corresponding feature points included in the first feature points and the second feature points; and
alerting a traffic infrastructure system based on a magnitude of the difference exceeding a threshold.

13. The method of claim 12, further comprising operating a vehicle based on a second computer determining a vehicle path based on determining objects included in third point cloud data acquired by the sensor.

14. The method of claim 13, wherein operating the vehicle is based on the second computer controlling vehicle powertrain, vehicle steering, and vehicle brakes.

15. The method of claim 12, further comprising acquiring the first lidar point cloud and the second lidar point cloud with a stationary lidar sensor.

16. The method of claim 12, wherein the first feature points are stored in a memory and compared to a plurality of second feature points determined based on a plurality of second lidar point clouds.

17. The method of claim 12, further comprising determining the first feature points based on averaging one or more lidar point clouds.

18. The method of claim 12, further comprising determining surface normal vectors for M first data points in the first point cloud data.

19. The method of claim 18, further comprising determining the first feature points by determining a Fast Point Feature Histogram for each of the M first data points based on the surface normal vectors.

20. The method of claim 12, further comprising determining the dynamic objects in the second point cloud data based on the three-dimensional occupancy grid by deleting data points from the second point cloud data that do not correspond to occupied grid cells from the three-dimensional occupancy grid.

* * * * *